United States Patent [19]

Frey

[11] 4,426,892

[45] Jan. 24, 1984

[54] COUPLING

[76] Inventor: William L. Frey, 303 Ivory Ave., Pittsburgh, Pa. 15214

[21] Appl. No.: 146,062

[22] Filed: May 2, 1980

[51] Int. Cl.³ .................. F16H 47/00; F16H 57/10
[52] U.S. Cl. ............................ 74/785; 74/720
[58] Field of Search ............... 74/661, 665 A, 674, 74/675, 688, 720, 785, 786, 787, 788, 681, 687, 665 P; 254/297, 344; 60/442, 39.16 S, 39.16 SI, 718, 624, 607, 608; 417/405; 415/122 R

[56] References Cited

U.S. PATENT DOCUMENTS

| Number | Date | Name | Class |
|---|---|---|---|
| 400,150 | 3/1889 | Weston | 254/344 |
| 1,242,974 | 10/1917 | Pinckney | 74/688 |
| 1,609,074 | 11/1926 | Evans | 254/344 |
| 1,609,419 | 12/1926 | Norris | 254/344 |
| 1,776,779 | 9/1930 | Bricken | 254/344 |
| 2,000,959 | 5/1939 | Jimerson | 254/344 |
| 2,147,528 | 2/1939 | Fottinger | 74/688 |
| 2,290,319 | 7/1942 | Dodge | 74/688 |
| 2,292,482 | 8/1942 | Roche | 74/688 |
| 2,558,738 | 7/1951 | Davis, Jr. et al. | 74/785 |
| 2,583,872 | 1/1952 | Newcomb | 60/39.33 |
| 2,585,968 | 2/1952 | Schneider | 60/624 |
| 2,672,769 | 3/1954 | Gerst | 74/688 |
| 2,688,839 | 9/1954 | Daub | 60/624 |
| 2,848,866 | 8/1958 | Geislinger | 60/624 |
| 2,939,441 | 6/1960 | Luttrell | 60/624 |
| 3,007,302 | 11/1961 | Vincent | 60/624 |
| 3,023,638 | 3/1962 | Westbury et al. | 74/687 |
| 3,080,704 | 3/1963 | Nallinger | 60/13 |
| 3,080,764 | 3/1963 | Miller et al. | 74/665 GA |
| 3,109,525 | 11/1963 | Welch | 254/344 |
| 3,194,087 | 7/1965 | Kronogard | 74/661 |
| 3,238,713 | 3/1966 | Wallace | 60/624 |
| 3,396,610 | 8/1968 | Rich, Jr. et al. | 74/785 |
| 3,498,053 | 3/1970 | Johnston | 60/624 |
| 3,507,113 | 4/1970 | Herrmann et al. | 60/39.16 SI |
| 3,923,416 | 12/1975 | Frey | 415/76 |
| 3,928,971 | 12/1975 | Spath | 60/614 |
| 3,961,484 | 6/1976 | Harp, Jr. | 60/624 |
| 3,979,913 | 9/1976 | Yates | 60/618 |
| 3,986,575 | 10/1976 | Eggmann | 180/66 B |
| 4,019,324 | 4/1977 | Coxon | 60/624 |
| 4,031,705 | 6/1977 | Berg | 60/615 |

FOREIGN PATENT DOCUMENTS

| Number | Date | Country | Class |
|---|---|---|---|
| 612600 | 1/1961 | Canada | 74/786 |
| 630910 | 12/1927 | France | 74/787 |
| 2089597 | 7/1972 | France | 60/624 |
| 44-18208 | 4/1969 | Japan | 74/786 |
| 100708 | 1/1941 | Sweden | 254/344 |
| 151044 | 8/1955 | Sweden | 254/344 |
| 136544 | 11/1920 | United Kingdom | 60/624 |

Primary Examiner—Leslie A. Braun
Assistant Examiner—D. Wright
Attorney, Agent, or Firm—Webb, Burden, Robinson & Webb

[57] ABSTRACT

A coupling for operatively connecting a rotary turbine having a hub carrying a plurality of wires with a driven shaft. An external sun gear is formed on the turbine hub and a planetary gear carrier is mounted on the shaft for rotation with the shaft. The planetary gear carrier supports a plurality of planetary gears mounted for individual rotation which mesh with the sun gear on the hub. A ring gear carrier is mounted for rotation about the shaft and is formed with an internal ring gear which meshes with the planetary gears. A brake band surrounds the external periphery of the ring gear carrier and may be tightened to embrace the external surface of the ring gear carrier to lock it. When the internal ring gear is locked by the brake band, rotation of the planetary gears rotates the planetary gear carrier which rotates the shaft. When the brake band is loose, the ring gear carrier is rotated about the shaft by the planetary gears which are rotated by the sun gear on the shaft.

8 Claims, 4 Drawing Figures

COUPLING

My invention relates generally to a coupling for transmitting power from a driven member to a driven shaft and, more particularly, to a coupling for connecting a radial flow turbine to a rotating shaft to transmit supplemental power from the turbine to the shaft.

In my U.S. Pat. No. 3,923,416 I disclose a radial flow turbine which develops a high torque when used with a compressor having a small fluid output. I suggest several uses for the turbine including connection to the crankshaft of an internal combustion engine to supplement the power output of the engine.

It is known in the art to mechanically couple turbines powered by engine heat or by engine exhaust gases to the output shaft of the engine to supplement the power transmitted to the shaft from the engine or to provide power for the operation of auxiliary equipment. In this regard attention is directed to U.S. Pat. Nos. 4,019,324; 3,986,575; 3,979,913 and 3,080,704. It is also known to position a turbine driven by engine exhaust gases directly on the crankshaft of the engine to supply additional power to the crankshaft. In this regard attention is directed to U.S. Pat. No. 3,928,971.

While the Otto engine is the standard engine, alternate power plants such as the Sterling, Brayton, Rankine, Diesel, Electric and various hybrids of the above are also used. A turbine which supplements the power transmitted by an engine to a shaft must be relatively small in size, and the coupling to the shaft which is rotating at a high speed must be efficient and compact. My novel coupling and the turbine of my earlier patent meet these requirements and may be used to supplement the power output from any of the above mentioned engines. The turbine may be located on the crankshaft between the flywheel of the engine and a transmission; may be mounted on an end of the crankshaft; or may be connected to the end of the crankshaft. The turbine may also be mounted at a side of the engine, and the turbine output shaft may be connected with the engine crankshaft by a drive mechanism such as V belts and reduction gears although such is a cumbersome and relatively inefficient arrangement.

The coupling of my invention is described hereinafter with reference to the accompanying drawings, wherein.

Figure 1:
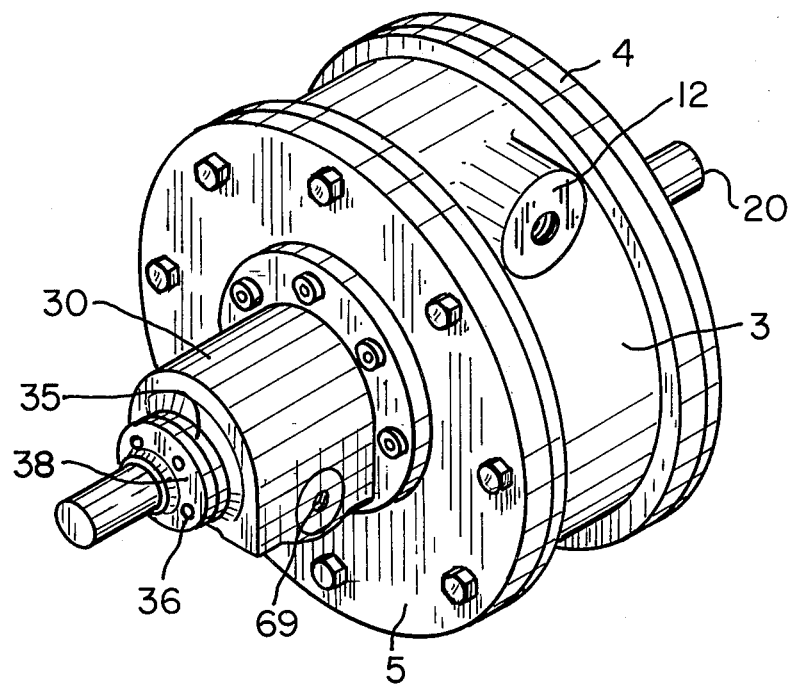
FIG. 1 is an isometric view of a turbine and coupling mounted on a shaft.
Figure 2:
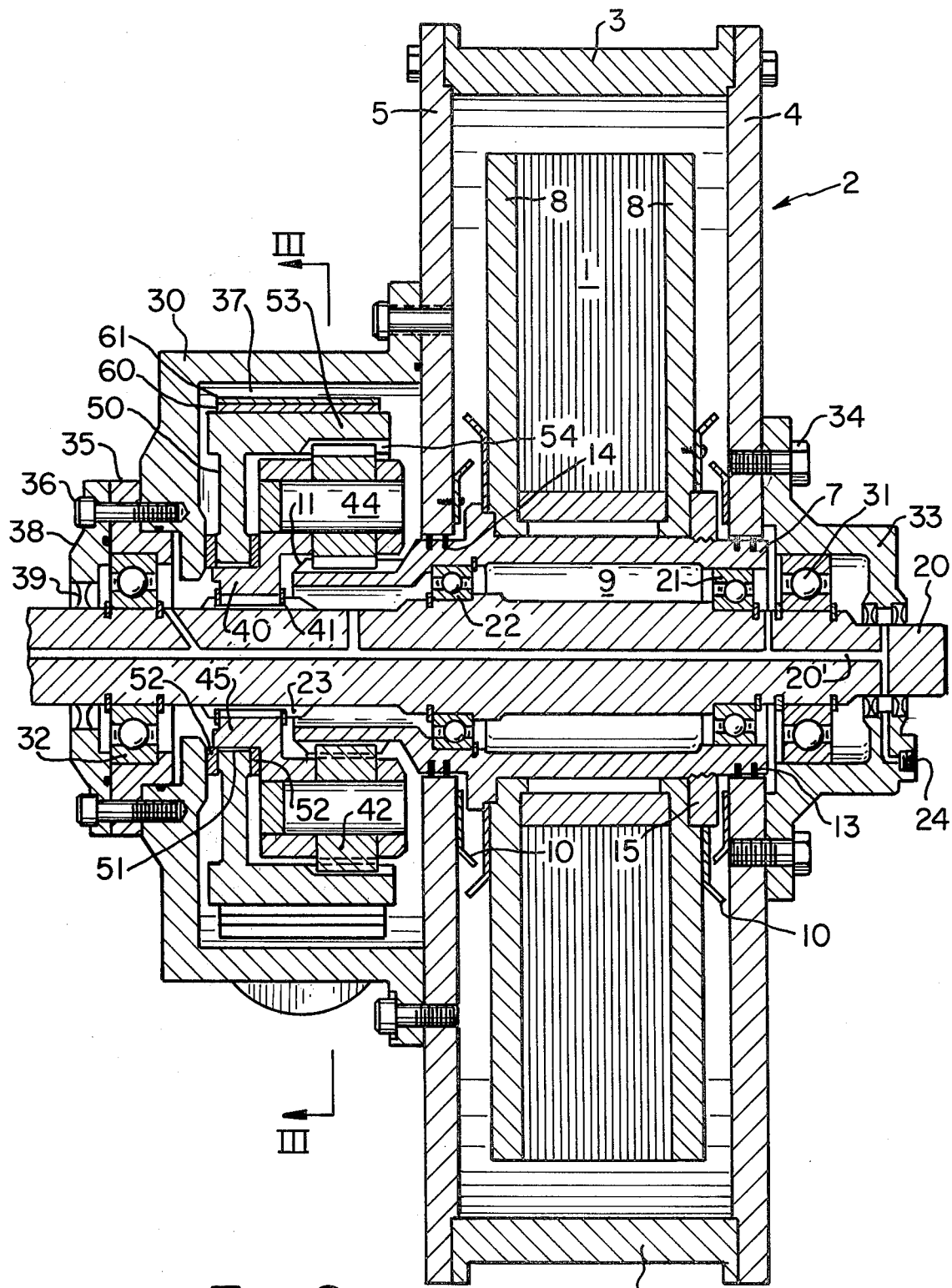
FIG. 2 is a section through the turbine and coupling of FIG. 1 in a direction parallel to the shaft.

With specific reference to FIGS. 1 and 2 of the drawings, a turbine 1 is located within a turbine housing 2 which has a cover portion 3, spaced end plates 4 and 5 and a bottom portion 6. The bottom portion is formed with a condensate discharge opening (not shown) as is well known in the art. The turbine may be constructed in accordance with my U.S. Pat. No. 3,923,416 although other types of turbines may also be used. A turbine hub 7 carries turbine wires and side plates 8 to protect the wires. Hub 7 extends out of housing 2 through openings in end plates 4 and 5. The side plates and wires are held in the proper longitudinally position on hub 7 by a nut 15 which is threaded on one end of the hub and forces one side plate 8 against an exterior shoulder spaced along the hub from the threaded portion which receives the nut. The hub is formed with a central bore 9 throughout its length, and the end of the hub adjacent end plate 5 is formed with a reduced diameter and has angularly arranged teeth which form a sun gear 11 on the exterior of the hub. The cover portion of turbine housing 2 has an inlet 12 which is adapted to receive a nozzle connected to a source of compressed fluid such as air or steam as is shown in my U.S. Pat. No. 3,923,416. The cover portion of housing 2 is also provided with a fluid exhaust (not shown) arranged in the manner disclosed in my U.S. Pat. No. 3,923,416. It will be understood by those skilled in the art that a plurality of inlets and exhausts may be provided in cover portion 3 as disclosed in FIG. 3 of my U.S. Pat. No. 3,923,416. The fluid supplied to the inside of housing 2 contacts the wires carried on hub 7 to rotate the turbine relative to the housing. An annular deflector 10 is located on the inside of each end plate 4 and 5 and on the exterior of each side plate 8 to direct condensate to the bottom portion of housing 2 during operation of the turbine.

With further reference to FIG. 2 of the drawings, it will be seen that ring seals 13 and 14 are located in annular grooves around hub 7 in the openings in end plates 4 and 5. The seals retain a lubricant around the various bearings and retain the turbine drive fluid inside of turbine housing 2. The turbine hub is spaced from the exterior of an engine crankshaft 20 by bearings 21 and 22 which permit relative rotation of the hub and shaft 20. While the turbine hub is shown and described hereinafter as surrounding a crankshaft, it will be understood by those skilled in the art that it may also be attached to a crankshaft extension by various arrangements. The crankshaft extends completely through bore 9 in hub 7 and is formed with longitudinally spaced external shoulders to locate bearings 21 and 22 along its length. The bearings are held in place against the shoulders by snap rings. Rotation of crankshaft 20 relative to housing 2 and to the coupling housing, which is designated 30, is accomplished by mounting the crankshaft in bearings 31 and 32. Bearing 31 is supported in end cap 33 which is bolted to end plate 4 by bolts 34, and bearing 32 is supported in an annular member 35 which is held on coupling housing 30 by bolts 36. A cap 38 having a central opening to accommodate crankshaft 20 and having a seal 39 around the crankshaft is also held by bolts 36. Bearings 31 and 32 are maintained in the correct location along crankshaft 20 by snap rings. Crankshaft 20 is formed with a longitudinal passageway 20' which communicates with an inlet 24 for a lubricant. The lubricant passes through passageway 20' and through radial passageways to lubricate bearings 21, 22, 31 and 32. Passageway 20' also communicates with an outlet (not shown) for the lubricant.

Figure 3:
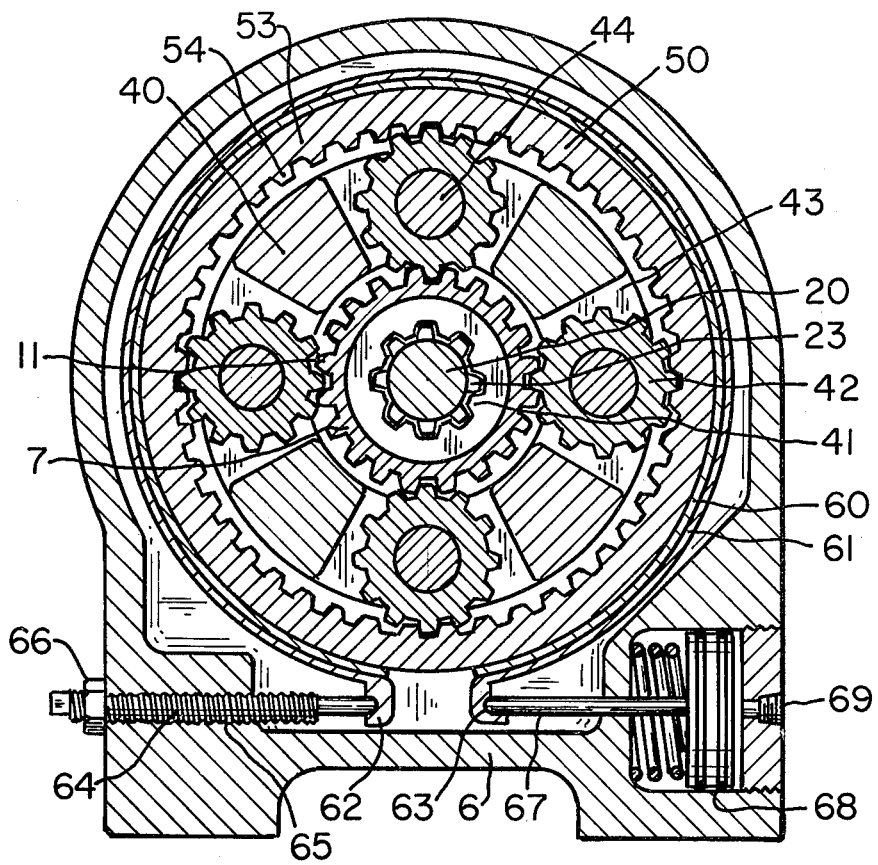
FIG. 3 is a section on line III—III of FIG. 2.

A planetary gear carrier 40 is located in a chamber 37 formed by coupling housing 30. Carrier 40 has a centrally located opening with inwardly extending equally spaced splines 41 located around its periphery. Crankshaft 20 passes through the central opening in carrier 40, and the portion of the crankshaft located within the opening is formed with exteriorly extending equally spaced splines 23 which cooperate with splines 41 on carrier 40 so that the planetary gear carrier rotates with crankshaft 20. The planetary gear carrier is held in position along crankshaft 20 by snap rings. Carrier 40 supports a plurality of planetary gears 42 in which are located slots 43 at angularly spaced intervals around its circumference. Each planetary gear is individually mounted on carrier 40 by a planetary gear shaft 44 which permits independent rotation of each gear 42 about its shaft 44 relative to the planetary gear carrier. As seen in FIG. 3 of the drawings, there are four planetary gears 42 equally spaced around carrier 40, but it will be understood by those skilled in the art that the number of planetary gears is not critical so long as the gears are equally spaced angularly about the planetary gear carrier.

An internal ring gear carrier 50 having a central opening forming a bearing surface 51 is mounted on an annular extension 45 of planetary gear carrier 40. Thrust bearings 52 are located between ring gear carrier 50 and planetary gear carrier 40 on one side and coupling housing 30 on the other side. Bearing surface 51 and thrust bearings 52 permit relative rotation of planetary gear carrier 40 and ring gear carrier 50. The ring gear carrier has an annular rim 53 with an internal ring gear 54 extending completely around its inner periphery. Internal ring gear 54 cooperates with the individual planetary gears 42 so that when the internal ring gear is in the unlocked or free wheeling condition, it is driven by rotation of planetary gears 42, and internal ring gear carrier 50 rotates on bearing surface 51 relative to planetary gear carrier 40. When internal ring gear carrier 50 is locked, as explained hereinafter, it acts as a rack and rotation of planetary gears 42 causes them to "walk" around internal ring gear 54 and transfer rotary motion to planetary gear carrier 40 which is transmitted to crankshaft 20 to rotate the crankshaft. It will be understood that sun gear 11 on the exterior of turbine hub 7 rotates when the turbine hub is rotated by fluid supplied to housing 2 and drives planetary gear carrier 40 which rotates planetary gears 42 about shafts 44. Thus, rotation of turbine 1 by compressed fluid supplied to the inside of turbine housing 2 rotates sun gear 11 which rotates planetary gears 42 about shafts 44, and the planetary gears travel along internal ring gear 54 which is locked in the stationary position to rotate planetary gear carrier 40 and shaft 20.

My coupling includes a split brake band 60 located in chamber 37 surrounding the external periphery of internal ring gear carrier 50. It will be seen in FIG. 3 of the drawings that brake band 60 is surrounded by and attached to an actuator band 61 formed with depending lips 62 and 63 at its opposite ends. Lip 62 is in operative contact with the end of an adjustment screw 64 which is located in a threaded passage 65 extending through the lower portion of the turbine housing. The screw is provided with a lock nut 66 to hold it in a desired adjusted position. Lip 63 on the other end of band 61 is in operative contact with a rod 67 which extends into the turbine housing and is moved relative to the housing and to lip 63 by a hydraulic servo mechanism 68 with a fluid inlet 69. When rod 67 is extended by servo mechanism 68, the end of the rod forces lip 63 on band 61 toward lip 62 to compress the band and draw brake band 60 tightly around the exterior of internal ring gear carrier 50 and prevent rotation thereof. While I have shown and described a hydraulic servo mechanism, it will be understood by those skilled in the art that electric, mechanical and pneumatic mechanisms may also be used. Additionally, rod 67 may be moved by a mechanism mounted on the outside of turbine housing 2.

In operation, when fluid is supplied to the interior of turbine housing 2, turbine 1 will rotate and the turbine will supplement the power supplied to crankshaft 20 which is a relationship known in the art as "turbo-compounding." In order to turbo-compound the crankshaft, brake band 60 is tightened by actuator band 61 to embrace the external surface of internal ring gear carrier 50 and rotation of internal ring gear 54 by planetary gears 42 is terminated. Termination of the rotation of internal ring gear 54 means that planetary gears 42, which continue to rotate because they are driven by sun gear 11 on turbine hub 7, cause planetary gear carrier 40 to rotate. The planetary gears 42 walk around internal ring gear 54 which is now stationary, and since the planetary gear carrier is splined to crankshaft 20, the rotary motion of the planetary gear carrier is transmitted to crankshaft 20. When the engine crankshaft is not turbo-compounded, the crankshaft and planetary gear carrier 40 are rotated by the engine. Rotation of carrier 40 rotates planetary gears 42 which will rotate internal ring gear carrier 50 since brake band 60 is not tightened and ring gear carrier 50 is free wheeling. Planetary gears 42 are in mesh with sun gear 11 on turbine hub 7, but since inner gear ring 54 is free wheeling, the planetary gears will not transmit rotary motion to sun gear 11 and the turbine hub will not be rotated by crankshaft 20.

Figure 4:
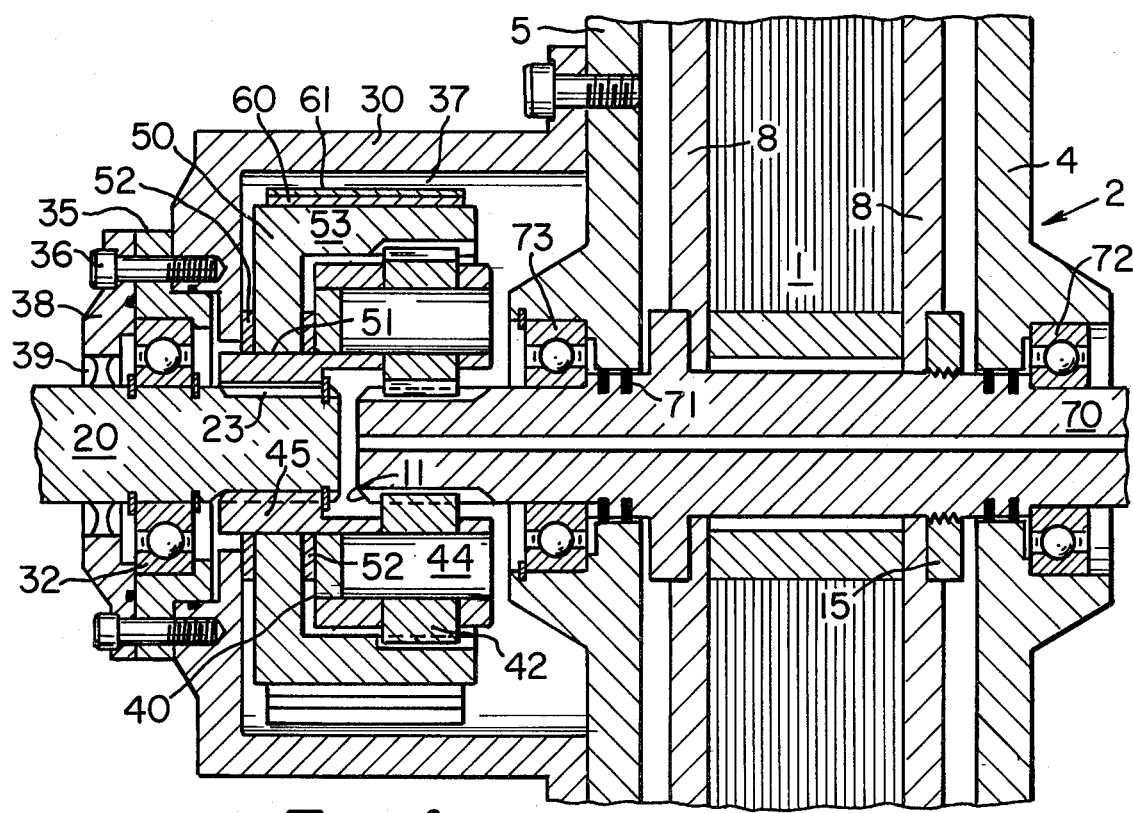
FIG. 4 is a section of a second embodiment of my invention with parts broken away.

The embodiment shown in FIG. 4 of the drawings is similar to that shown in FIGS. 2 and 3, and like parts are identified by like reference numerals. The coupling in the embodiment shown in FIG. 4 is located at the end of an engine crankshaft, and operates to turbo-compound the engine in the same manner as in the embodiment shown in FIGS. 2 and 3. The basic difference between the embodiment shown in FIG. 4 and that shown in FIGS. 2 and 3 is that there is no through shaft in the embodiment shown in FIG. 4 and turbine hub 70 is solid. The engine crankshaft terminates in coupling chamber 37 and the end thereof is spaced from the end of turbine hub 70. By utilizing the arrangement shown in FIG. 4, sun gear 11 has a smaller diameter than in the embodiment shown in FIGS. 2 and 3 and the power transmitted to the crankshaft is increased since a smaller diameter drive gear, sun gear 11 in my coupling, will result in an increase in the power transmitted thereby. In the embodiment shown in FIGS. 2 and 3 the turbine hub extension which carries the sun gear must have a large diameter to accommodate the bore through which the crankshaft extends. Since the embodiment shown in FIG. 4 is located at the end of the crankshaft, no bore is necessary and the hub extension which carries the sun gear has a smaller diameter.

In the embodiment shown in FIG. 4, the hub is formed with a shoulder, and a nut 15 is threaded onto the hub to hold the wires and end plates 8 on the hub. The turbine hub is also formed with annular grooves which accommodate ring seals 71 which cooperate with the periphery of the openings in end plates 4 and 5 to provide a seal between the interior of turbine casing 2 and hub bearings 72 and 73. In the embodiment of FIG. 4, end plate 4 is formed to accommodate bearing 72 and to receive a cap (not shown) with a lubricant inlet which will cooperate with the lubricant passageway through hub 70. The cap may have a central opening with appropriate seals to permit the hub to extend outwardly from the cap if the turbine is to drive auxiliary equipment, or the cap may be closed to completely enclose the end of the hub and the bearings 72.

My invention provides a novel and compact arrangement whereby energy is transmitted from a rotary turbine to a rotating crankshaft to turbo-compound the engine and thereby increase the speed of rotation of the engine crankshaft and provide additional power which can be used to drive a vehicle or to operate auxiliary devices.

Depending upon the size of the turbine and the pressure of the compressed fluid which drives the turbine, it is possible to vary the speed of rotation of the turbine. By utilizing appropriate gear ratios and the coupling of my invention, it is possible to decrease the revolutions of the turbine to a desired ratio with the crankshaft revolutions. For example, using a 3:1 ratio, a crankshaft rotating at 2200 rpm at 50 mph requires the turbine to rotate at 6600 rpm which is well within the operating capabilities of turbines which may be utilized with my coupling.

My invention has numerous applications where compact and efficient couplings are required to change potential fluid energy to rotary energy. One application is utilizing a turbine in connection with the exhaust leg of an internal combustion engine wherein a fluid generation circuit provides the propelling fluid for the turbine, and the turbine is connected to the engine crankshaft to supplement the power output of the crankshaft. Alternatively, the turbine may be connected to a steam generating unit and the engine exhaust gases can generate steam which will drive the turbine. Such an arrangement is generally disclosed in U.S. Pat. No. 4,031,705.

While I have described preferred embodiments of my invention in connection with the above drawings, it will be understood that the invention may be embodied within the scope of the appended claims.

I claim:

1. In combination with a driven shaft and a rotary turbine having a housing forming a turbine chamber, an elongated hub rotatably mounted in said housing and extending axially through said turbine chamber, a plurality of radial wires mounted on said hub and located in said turbine chamber, a sun gear on the external surface of an end of said elongated hub and located outside of said housing, said driven shaft coaxial with said hub adapted to be connected to and rotated by a primary power means external to said rotary turbine and a coupling for selectively connecting said hub to said driven shaft to transmit additional rotary motion, said additional rotary motion being imparted from said hub to said driven shaft to supplement the primary power applied to said driven shaft, said coupling including a planetary gear carrier nonrotatably mounted on said driven shaft for rotation with said shaft, a plurality of angularly spaced planetary gears rotatably mounted on said planetary gear carrier and the radial distance between the axis of rotation of each of said planetary gears and the axis of rotation of said sun gear being the same, each of said planetary gears meshing with said sun gear on said hub, an internal ring gear meshing with each of said plurality of planetary gears and means mounting said ring gear for rotation about said driven shaft, brake means for said internal ring gear, means to actuate said brake means to lock said internal ring gear, whereby rotation of said sun gear drives said plurality of planetary gears and said planetary gears drive said internal ring gear when said brake means is nonactuated, and wherein no additional rotary motion is imparted to said driven shaft and said internal ring gear is stationary when said brake means is actuated and rotation of said planetary gears by said sun gear rotates said planetary gear carrier and said driven shaft to impart said additional rotary motion to said driven shaft.

2. The combination set forth in claim 1 including a longitudinal central bore extending through said elongated hub and said shaft extending completely through said longitudinal central bore.

3. The combination set forth in claim 2 including bearing means located in said longitudinal central bore between said shaft and said elongated hub and longitudinally spaced along said elongated hub.

4. The combination set forth in claims 1 or 2 wherein said planetary gears are angularly spaced at equal intervals around said planetary gear carrier.

5. The combination set forth in claim 4 wherein said planetary gear carrier has a plurality of angularly spaced radially extending slots and each of said planetary gears is located in one of said slots formed in said planetary gear carrier.

6. The combination set forth in claim 4 including a separate shaft rotatably mounting each of said planetary gears on said planetary gear carrier.

7. The combination set forth in claim 1 wherein said brake means is a split band surrounding substantially the entire periphery of said means mounting said internal ring gear, each end of said band being formed with a lip, an adjustment screw threaded in said turbine housing contacting one of said lips, actuating means mounted on said turbine housing having a rod contacting the other of said lips, whereby extension of said rod by said actuating means forces said lips together to tighten said split band on said means mounting said internal ring gear to lock said means mounting said internal ring gear and said internal ring gear.

8. The combination set forth in claim 1 including a coupling housing mounted on said turbine housing forming a chamber enclosing said coupling, an annular seal surrounding said hub located between said coupling chamber and said turbine chamber, whereby the interior of said turbine chamber is separated from the interior of said coupling chamber and means to supply compressed fluid to said turbine chamber to rotate said turbine.

* * * * *